(12) United States Patent
Inokuchi

(10) Patent No.: US 9,097,799 B2
(45) Date of Patent: Aug. 4, 2015

(54) AIRBORNE DEVICE FOR PREVENTING TURBULENCE-INDUCED ACCIDENTS

(75) Inventor: Hamaki Inokuchi, Tokyo (JP)

(73) Assignee: JAPAN AEROSPACE EXPLORATION AGENCY, Tokyo (JP)

( * ) Notice: Subject to any disclaimer, the term of this patent is extended or adjusted under 35 U.S.C. 154(b) by 1226 days.

(21) Appl. No.: 12/944,821

(22) Filed: Nov. 12, 2010

(65) Prior Publication Data

US 2011/0134412 A1 Jun. 9, 2011

(30) Foreign Application Priority Data

Dec. 7, 2009 (JP) ................................ 2009-277379

(51) Int. Cl.
*G01S 17/58* (2006.01)
*G01S 17/93* (2006.01)
*G01S 17/95* (2006.01)

(52) U.S. Cl.
CPC .................. *G01S 17/58* (2013.01); *G01S 17/93* (2013.01); *G01S 17/95* (2013.01)

(58) Field of Classification Search
CPC ........................................... G01S 17/58–17/93
USPC ................ 356/3.01–28, 3.01–3.15, 4.01–4.1, 356/5.01–5.15, 6–22, 28.5
See application file for complete search history.

(56) References Cited

U.S. PATENT DOCUMENTS

| 6,751,532 B2 | 6/2004 | Inokuchi | |
| 2003/0009268 A1* | 1/2003 | Inokuchi | 701/14 |
| 2007/0077071 A1* | 4/2007 | Belenkiy | 398/130 |

(Continued)

FOREIGN PATENT DOCUMENTS

| JP | 2003-14845 A | 1/2003 | |
| JP | 2007-232695 A | 9/2007 | |
| WO | WO2007/009759 | * 1/2007 | .............. G01S 17/95 |

OTHER PUBLICATIONS

Sato, Masayuki at al., "Gust Alleviation via Robust Model Predictive Control Using Prior Turbulence Information", Journal of the Japan Society for Aeronautical and Space Sciences, 2009, vol. 57, No. 668, pp. 345-353.

(Continued)

*Primary Examiner* — Luke Ratcliffe
(74) *Attorney, Agent, or Firm* — Cheng Law Group, PLLC

(57) ABSTRACT

An object of the present invention is to provide a method for preventing turbulence-induced accidents that can expand a detection range to about 20 km without increasing the size of a device or increasing the energy consumption, can perform planar distribution monitoring of turbulence when the turbulence is detected in the flight direction and also can output a signal for autopilot steering input that decreases the fuselage shaking when the turbulence is difficult to avoid, as well as to provide a device having those functions. In the method for preventing turbulence-induced accidents according to the present invention, an optical remote airflow measurement device of a Doppler lidar system using a laser beam is used to routinely enable distant turbulence to be detected by fixing a laser emission course in a flight direction and taking a long integration time of a reception signal, and to enable planar distribution of the turbulence to be displayed when turbulence is detected, by scanning the laser emission course in a horizontal direction and switching an image display to a two-dimensional display.

6 Claims, 3 Drawing Sheets
(1 of 3 Drawing Sheet(s) Filed in Color)

(56) References Cited

U.S. PATENT DOCUMENTS

2009/0143988 A1* 6/2009 Tillotson .......................... 702/3
2009/0310118 A1* 12/2009 Halldorsson .................... 356/28
2011/0013016 A1* 1/2011 Tillotson ...................... 348/135

OTHER PUBLICATIONS

Inokuchi, Hamaki et al., "Development of an Onboard Doppler Lidar for Flight Safety", Journal of Aircraft, 2009, vol. 46, No. 4, pp. 1411-1415.

* cited by examiner

AIRBORNE DEVICE FOR PREVENTING TURBULENCE-INDUCED ACCIDENTS

BACKGROUND OF THE INVENTION

1. Field of the Invention

The present invention relates to a technique for preventing turbulence-induced accidents by irradiating a laser beam into the atmosphere and receiving the laser beam scattered in the atmosphere, and more specifically to a device that prevents turbulence-induced accidents using an airborne Doppler lidar that measures a wind velocity in a remote region at a distance of from about several hundreds of meters to ten odd kilometers on the basis of the Doppler effect.

2. Description of the Related Art

Turbulence has recently attracted attention as a main cause of aircraft accidents, and a Doppler lidar using a laser beam has been researched and developed as an airborne device that detects turbulence in advance (see, for example, H. Inokuchi, H. Tanaka, and T. Ando, "Development of an Onboard Doppler lidar for Flight Safety," Journal of Aircraft, Vol. 46, No. 4, pp. 1411-1415, July-August 2009). Lidar is an abbreviation for "Light Detection And Ranging", that is, a technique for detection that uses light. With this technique, an irradiated light beam is scattered by fine aerosol floating in the atmosphere, the scattered beam is received, and the frequency variation amount (wavelength variation amount) according to the Doppler effect is measured, whereby the wind velocity is measured. Accordingly, the method is called Doppler lidar. Airborne weather radars that have already found practical use have an effective range as wide as several hundreds of kilometers. In the usual mode, the observation screen is displayed at all times and the pilot can monitor the screen as necessary, thereby making it possible to take the appropriate measures in advance. However, since the weather radars use scattering of microwaves on water droplets contained in the atmosphere, they are not effective when the sky is clear. By contrast, the Doppler lidar is effective when the sky is clear, but the effective range is greatly limited by comparison with that of the weather radars, and therefore the avoidance time interval is short. Moreover, with this method, the pilot watches the display at all times which undesirably increases workload. Therefore, where the device automatically determines the impending danger or abnormality and a function of notifying the pilot is provided, the pilot can monitor the display only upon receiving the notification and therefore the load on the pilot can be reduced.

Even when the presence of a turbulent region in front in the direction of the aircraft flight is clearly established, in the case in which the turbulent region cannot be avoided due to aircraft characteristics or the abrupt avoidance maneuver can by itself cause danger, the turbulent region is not avoided and the accident is prevented by performing a flight such that minimizes fuselage shaking when the aircraft enters the turbulent region (see, for example, Masayuki Sato, Nobuhiro Yokoyama, and Atsushi Sato, "Gust Alleviation via Robust Model Predictive Control Using Prior Turbulence Information" Journal of the Japan Society for Aeronautical and Space Sciences, Vol. 57, No. 9, 2009). Thus, when a pilot determines that the turbulence cannot be avoided, since the characteristics of the Doppler lidar are suitable for displaying at the dashboard in the cockpit, automatic gust alleviation control can be performed by adding a function of switching to a mode suitable for autopilot input.

The inventors have previously filed a patent application relating to "Wind Terbulence Prediction System" (Japanese Patent Application Publication No. 2003-14845, published on Jan. 15, 2003; U.S. Pat. No. 6,751,532). The object of the invention disclosed in this patent publication is to provide a measurement system that can measure three-dimensional wind terbulence and can verify in advance whether a warning is reliable, instead of producing a surprising sudden warning such as in the conventional wind shear system. This system can detect wind terbulence in a form such that measures that need to be taken can be easily determined, exhibits limited aerodynamic and structural effects when mounted on an aircraft, and is capable of measurements and produces no positional error even at a velocity equal to or less than 20 to 30 m/s, at which a Pitot tube is incapable of measurements, and when the airflow direction differs greatly from the fuselage axis. In this wind terbulence prediction system, a laser wind velocity meter of a coherent configuration incorporating a heterodyne receiver is mounted on an aircraft, a laser beam is irradiated, while being scanned in a cone shape, and scattered light from a wind terbulence region forward of the flying aircraft is received, whereby the three-dimensional air flow velocity in a remote region is measured. With consideration for the effect produced by a vertical wind and a fore and aft wind, the measured three-dimensional air flow information is converted into a vertical wind alone and displayed in a simplified form in two dimensions, and wind terbulence is expressed by breakdown thereof into a turbulence intensity and an average wind. Further, when the measured wind velocity information is transmitted to the pilot, the time that elapses before the aircraft encounters the turbulence, rather than the distance, is used as a reference for displaying the terbulence position, and parts of the cylindrical optical system of the wind measuring lidar is cut away, thereby facilitating the mounting thereof.

However, the specific nature (characteristic) of this system is such that since the reception intensity of the laser scattered light detected by the Doppler lidar of this kind is inversely proportional to a second power of the distance between the device and the measurement region, the received signal intensity is generally high and the measurement accuracy increases in near-range measurements, but as the distance increases, the received signal intensity decreases with respect to the internal noise component, the ratio of incorrectly measured values gradually increases, and measurement reliability decreases. Conventional methods designed to improve the far-range measurement performance involve increasing the transmission output and expanding the reception area, but both these methods unavoidably lead to the increased size of the device or raise cost due to increased energy consumption. In particular, when a device is mounted on an aircraft, electric power for driving the device and a space that can be used for mounting are limited, and at a high altitude where passenger aircraft cruise, the amount of aerosol in the atmosphere decreases. As a result, the performance degradation cannot be avoided and the possibility of improving the measurement capability by a method increasing the transmission output is limited.

SUMMARY OF THE INVENTION

It is an object of the present invention to provide a method and a device that can resolve the above-described problems, that is, a method for preventing turbulence-induced accidents that can expand a detection range to about 20 km without increasing the size of a device or increasing the energy consumption, can perform planar distribution monitoring of turbulence when the turbulence is detected in the flight direction and also can output a signal for autopilot steering input that decreases the fuselage shaking when the turbulence is difficult to avoid, as well as a device having those functions.

In order to attain the above-described object, the device for preventing turbulence-induced accidents in accordance with the present invention uses an optical remote airflow measurement device that emits (transmits) a laser beam as a transmission signal into the atmosphere, receives light produced by scattering of the laser beam by aerosol contained in the atmosphere as a reception signal, and measures a wind velocity of airflow in a remote region on the basis of a Doppler shift between the transmission signal and the reception signal, wherein the number of noise components in the reception signal that will be received is generally assumed to increase due to the decrease in intensity with the distance, a signal-to-noise ratio is improved by monitoring a remote airflow only on one line forward in the flight direction before turbulence is initially detected and airflow monitoring at a larger distance is enabled. When a Doppler lidar detects turbulence at a large distance forward in the flight direction, a warning can be automatically issued to the pilot by sound or display. Such a mode in which a laser beam course is not scanned is called a turbulence detection mode. When an aircraft is in a cruise mode, the flight is practically linear, and in a way point in which the direction is switched, the pilot can pan the laser emission course manually and monitor the scheduled flight direction. Likewise, when the flight altitude is changed, the pilot intentionally tilts the elevation angle of laser irradiation.

Where a warning is generated automatically, the pilot can switch the device for preventing turbulence-induced accidents to a two-dimensional display mode to adapt to the turbulence. The pilot can select the two-dimensional display mode at any time, but in the two-dimensional display mode, the integration time of the received light cannot be extended because the laser beam should be scanned in the horizontal direction, and the upper limit of the measurement range is about 10 km. When a turbulent region is detected in front at a distance of 10 km, it is highly probable that the aircraft capabilities will still allow the turbulent region to be avoided, but this is impractical since the pilot should attentively monitor the screen display at all times to take appropriate measures. For this reason, it is decided that the two-dimensional display mode is selected on the basis of a warning produced in the turbulence detection mode. However, under low-altitude and low-speed conditions during take-off and landing, the measurement range of the Doppler lidar is sufficiently long. Therefore, it is appropriate to select the two-dimensional display mode as a standard mode.

Even when the state of turbulence can be grasped in a two-dimensional display mode, there is, conversely, a chance of performing an unnecessary avoidance maneuver when no departure from the present flight route is allowed or an unavoidable turbulent region is present. Under such circumstances, a gust alleviation mode is provided in the present device for preventing turbulence-induced accidents in order to avoid an accident. In the gust alleviation mode, the laser beam is scanned in the vertical direction and the integration time of the received light is made shorter than in the two-dimensional display mode. The scanning in the vertical direction can expand two-dimensionally a wind velocity vector. The shortened integration time leads to increased data update rate and makes it possible to reduce the fuselage shaking by using the data as an input signal for autopilot control of the control surface. A transverse airflow component produces no effect since the pressure-receiving surface area of the fuselage is small, and therefore no computations for this component are required. The measurement range is decreased when the integration time is shortened, but this is not a problem because air information obtained 1 to 2 seconds in advance, that is, several hundred meters before the turbulent region, as an input for automatically controlling the control surface makes it possible to take the appropriate action.

The gist of the method for preventing turbulence-induced accidents in accordance with the present invention is in using an optical remote airflow measurement device of a Doppler lidar system using a laser beam, routinely enabling distant turbulence to be detected by fixing a laser emission course in a flight direction and taking a long integration time of a reception signal, and enabling a planar distribution of the turbulence to be displayed when turbulence is detected, by scanning the laser emission course in a horizontal direction and switching an image display to a two-dimensional display.

In addition to the above-described features of the method for preventing turbulence-induced accidents in accordance with the present invention, when a turbulent region is determined to be unavoidable in the optical remote airflow measurement method of a Doppler lidar system using a laser beam, a two-dimensional vector of airflow can be measured by scanning the laser beam emission course in a vertical direction and airflow information can be outputted for automatically controlling a control surface.

In the device for preventing turbulence-induced accidents in accordance with the present invention, a detection range is expanded and a planar distribution of turbulence can be displayed when the turbulence is detected in a flight direction by providing, in an optical remote airflow measurement device of a Doppler lidar system using a laser beam, detection means for routinely detecting distant turbulence by fixing a laser emission course in the flight direction and taking a long integration time of a reception signal; and means for scanning the laser emission course in a horizontal direction and switching an image display to a two-dimensional display when turbulence is detected by the detection means.

Means for generating a warning when turbulence is detected is further provided and a function of urging a pilot to monitor the image display switched to the two-dimensional display is provided.

The airborne device for preventing turbulence-induced accidents in accordance with the present invention also has a function of being capable of measuring a two-dimensional vector of airflow by scanning the laser beam emission course in a vertical direction and capable of outputting airflow information for autopilot steering input when a turbulent region is determined to be unavoidable in the optical remote airflow measurement device of a Doppler lidar system using a laser beam.

With the method for preventing turbulence-induced accidents in accordance with the present invention, an air flow only in the flight direction of the aircraft is mainly monitored, thereby expanding the effective range of the Doppler lidar to a maximum. As a result, it is not necessary for the pilot to monitor the two-dimensional display of airflow information at all times, and the display may be monitored only when turbulence is detected. Therefore, remote detection is made possible without increasing the size of the device or energy consumption, and airflow information can be easily grasped without increasing the pilot workload. As a consequence, by using the device for preventing turbulence-induced accidents, the pilot can rapidly recognize the airflow state on the flight course and can take adequate measures to avoid danger. Even if the airflow state on the flight course is such that cannot be handled by the pilot, where a two-dimensional vector of airflow is measured by scanning the laser emission course in the vertical direction, the shaking of fuselage can be reduced by using the measured airflow data for controlling the control surface for gust alleviation, which is one of inherent autopilot functions. As descried hereinabove, the method for preventing turbulence-induced accidents is expected to be advantageous for preventing turbulence-induced accidents of aircraft.

Further, the effect attained when the device for preventing turbulence-induced accidents in accordance with the present invention is provided with a function of executing the above-described method for preventing turbulence-induced accidents and also provided with means for automatically generating a warning is that the pilot may monitor the two-dimensional display of airflow information only when turbulence is detected and the workload can therefore be reduced.

BRIEF DESCRIPTION OF THE DRAWINGS

The patent or application file contains at least one drawing executed in color. Copies of this patent or patent application publication with color drawing(s) will be provided by the Office upon request and payment of the necessary fee.

DESCRIPTION OF THE PREFERRED EMBODIMENTS

Figure 1:
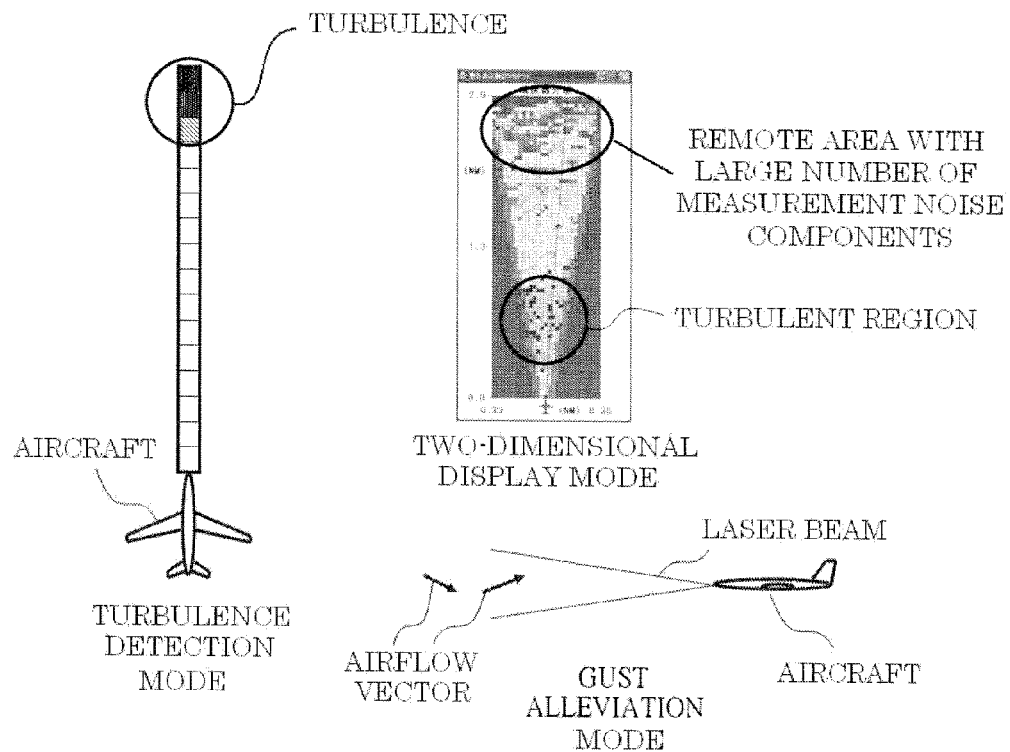
FIG. 1 is an explanatory drawing illustrating an operation mode of the airborne device for preventing turbulence-induced accidents in accordance with the present invention.

The present invention will be explained below in greater detail on the basis of embodiments thereof illustrated by the appended drawings. FIG. 1 is an explanatory drawing illustrating the concept of the airborne device for preventing turbulence-induced accidents in accordance with the present invention.

When the aircraft is in the cruise mode, a turbulence detection mode is used as a standard mode and only the airflow on the flight direction line is monitored by a fixed beam. When turbulence is detected within a measurement range in the turbulence detection mode by, for example, a method described in Japanese Patent Application Publication No. 2007-232695, the turbulence detection mode is switched to a two-dimensional display mode, the beam is scanned in the horizontal direction, and an airflow state is two-dimensionally displayed on the display. In this case, present device for preventing turbulence-induced accidents equipped with a warning function automatically issues a warning and attracts the pilot's attention to the two-dimensional display. In order to perform a airspeed decreasing operation to reduce the effect of the turbulence, switch on the seat belt sign, and request the termination of onboard services and also to grasp the planar state of the turbulent region, the pilot may perform the switching to the two-dimensional display mode by adjusting the scanning direction and conducting operations by an operation of the pilot. Where the turbulent region is determined to be avoidable on the basis of the two-dimensional display on the display, the avoiding maneuver is performed and measures are taken to bypass the turbulent region. Where the turbulent region is determined to be unavoidable, the gust alleviation mode is selected. In the gust alleviation mode, the bean scanning is switched to the vertical direction, an airflow vector in the vertical direction in the vicinity of the fuselage is accurately measured, the control surface such as an elevator is automatically operated by using the detection signal as an input signal for autopilot, and shaking of the fuselage caused by the turbulence during the flight through the turbulent region is reduced.

In the turbulence detection mode, the integration time of the reception signal can be extended by performing no scanning of the laser beam. The signal-to-noise ratio D of the integrated signal is represented by Eq. (1).

$$D = SNR \times \sqrt{N} \qquad (1)$$

where SNR is a signal-to-noise ratio of one pulse of the reception signal and N is an integral number of the reception signal.

This equation means that the integration of the reception signal is equivalent to increasing the signal-to-noise ratio by the square root of the integral number of the reception signal so that the effective signals be simply added up by the integration of the reception signal, whereas the unnecessary noise be canceled and reduced by the integration of the reception signal. Because the signal intensity decreases in remote measurements, which is a specific feature of Doppler lidars, the increase in the signal-to-noise ratio eventually makes it possible to expand the effective measurement distance and detect turbulence earlier. In a standard mode, the laser beam emission course is in the horizontal direction of heading, but can be changed manually, as necessary, by a pilot.

Figure 2:
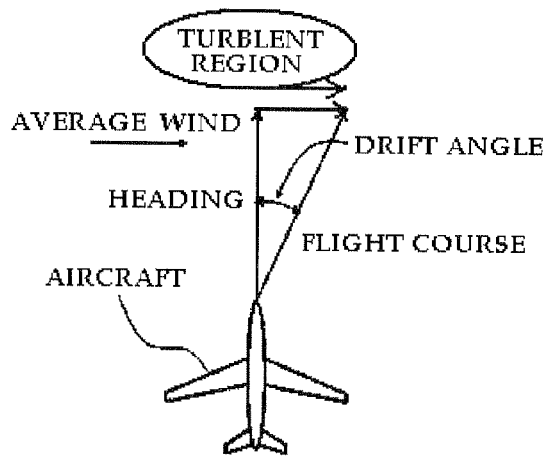
FIG. 2 is an explanatory drawing illustrating a flight course of an aircraft and a turbulent region movement in the case of a transverse wind.

When a transverse wind is present, the aircraft flies at a drift angle as shown in FIG. 2. In the case of a cruising altitude, the turbulent region flows under the effect of average wind in the same manner as the aircraft. Therefore, the monitoring course can readily be a heading course. When turbulence is assumed to be such that the origination region thereof does not move with the wind, as in the case of mountain waves, it is preferred that the pilot intentionally monitor the flight course, but such a turbulent area actually expands in the wind direction and therefore can be detected with a high probability even without panning. To begin with, the mountain waves can be predicted by the presently employed weather observations.

Figure 3:
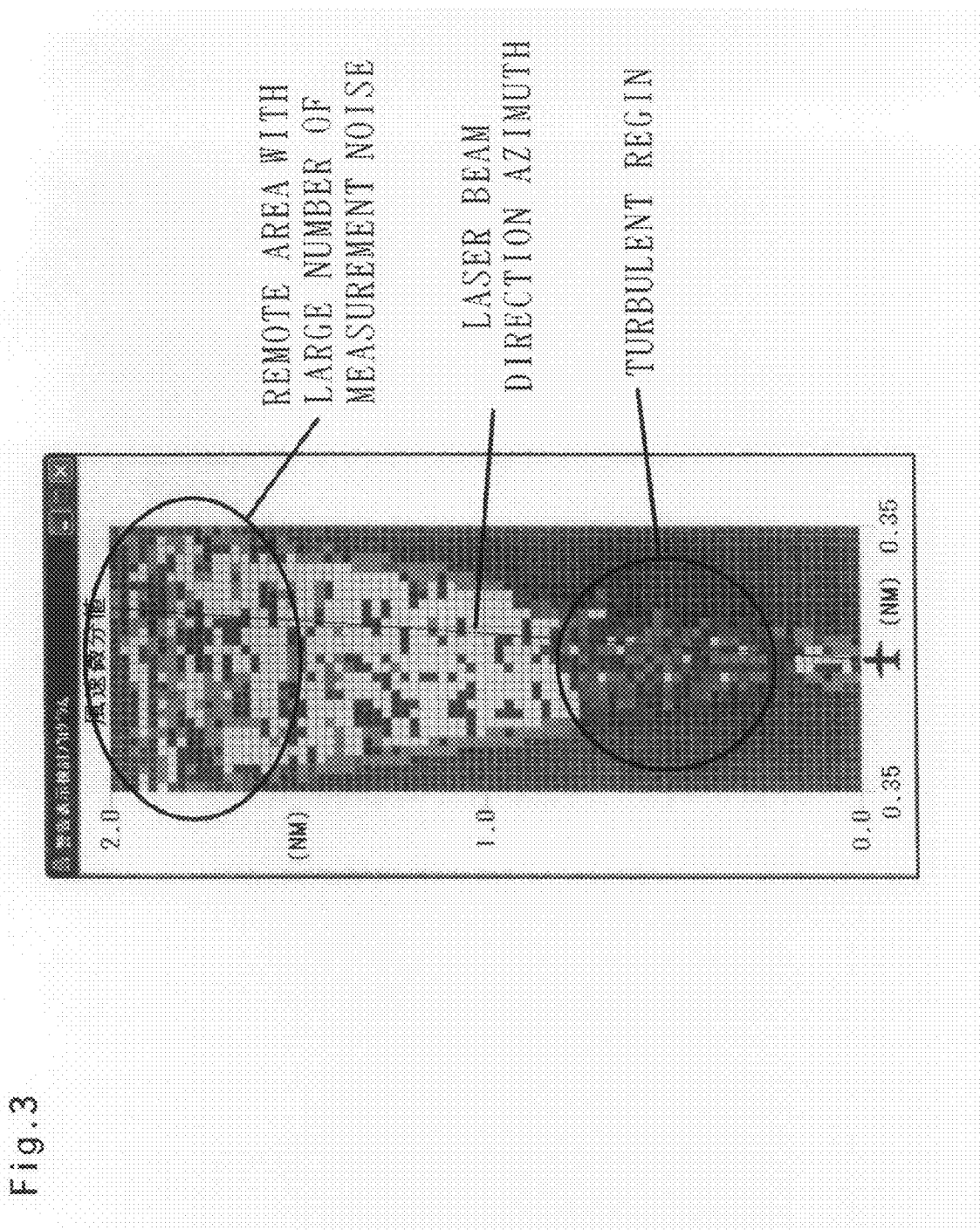
FIG. 3 is an explanatory drawing illustrating an example of a screen display method in a two-dimensional display mode in accordance with the present invention.
Figure 4:
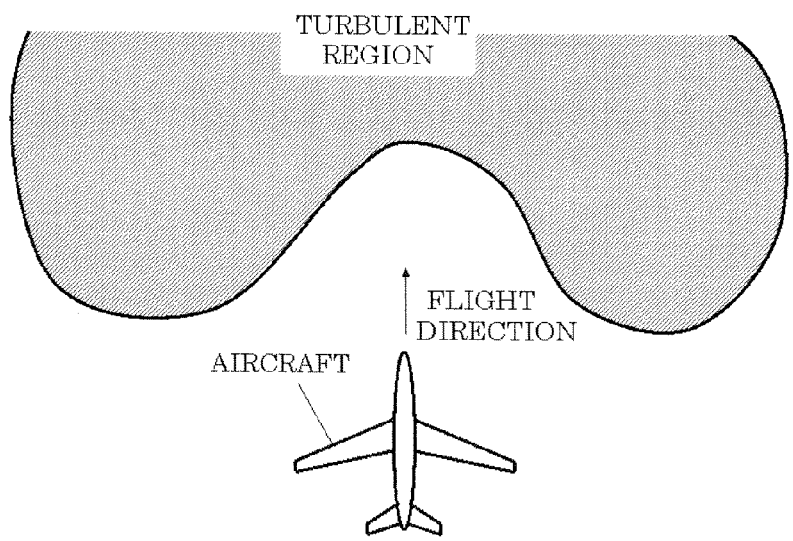
FIG. 4 is an explanatory drawing illustrating a shape example of a turbulent region that cannot be avoided.

In the two-dimensional display mode, the laser beam is scanned horizontally, as shown in FIG. 3, and airflow information on a plane is displayed on the screen (Note: the drawing is created by color images and also includes information that cannot be identified by gradation. For this reason, a color original drawing is added separately as a reference material). In this display the intensity of turbulence and a region thereof are shown. The pilot performs an avoidance flight operation when the turbulent region can be avoided and it is determined that the turbulent region should be avoided. If necessary, the pilot tilts the scanning plane in the vertical direction and can perform monitoring also on an altitude other than the present flight altitude. When the shape of the turbulent region is such that the turbulent region cannot be avoided, as shown in FIG. 4, or when the turbulent region should not be avoided for navigational reasons or the like, the pilot selects the gust alleviation mode.

In the gust alleviation mode, the laser beam is scanned vertically and an airflow vector is measured. The center of the scan width is a fuselage axis, and the beam is deflected to the same angle up and down. A method for conducting continuous measurements during scanning in principle can be considered, but here a method in which the scanning is temporarily stopped at the upper and lower ends of the scanning range to conduct measurements will be explained for the sake of simplicity.

Figure 5:
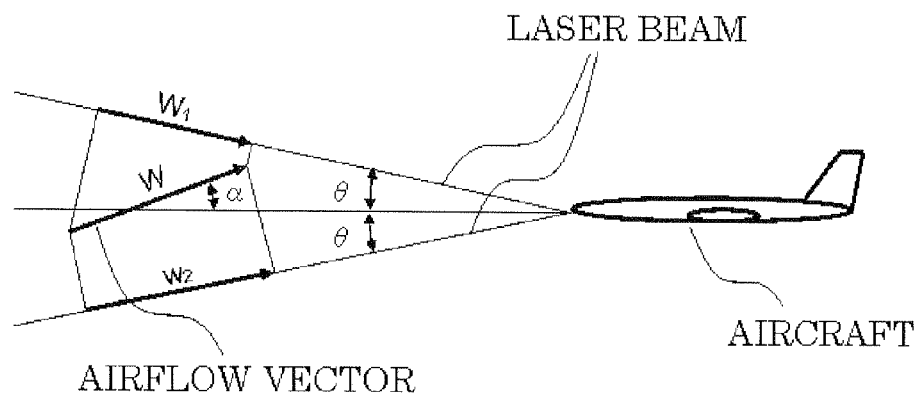
FIG. 5 is an explanatory drawing illustrating a measurement principle in a gust alleviation mode in accordance with the present invention.

In FIG. 5, the measurement values obtained with the Doppler lidar are $W_1$ and $W_2$ and they can be represented by the following formulas.

$$W_1 = W \cos(\alpha + \theta)$$

$$W_2 = W \cos(\alpha - \theta) \quad (2)$$

where W is an airflow vector, $W_1$ is a measurement value obtained when the laser beam is emitted at the upper end, $W_2$ is a measurement value obtained when the laser beam is emitted at the lower end, α is an angle formed by the airflow vector and the fuselage axis, when the airflow is stable, this angle matches the angle of attack, and θ is a half of the vertical scanning width of the laser beam.

Therefore, α can be determined from Eq. (3).

$$\alpha = (\cos^{-1}(W_1/W) + \cos^{-1}(W_2/W))/2 \quad (3)$$

W can be determined from either of Eq. (4).

$$W = W_1/\cos(\alpha + \theta)$$

$$W = W_2/\cos(\alpha - \theta) \quad (4)$$

The W and α found in the above-described manner are used as inputs for autopilot.

Examples

In the Doppler lidar that is presently being developed by the Japan Aerospace Exploration Agency (JAXA), the laser pulse frequency is 4 kHz and one data is acquired for 4000 pulses, that is, in a reception light integration time of 1 second. The lidar is aimed at a measurement range of about 9 km. In the turbulence detection mode, the integration time is set to 4 seconds, whereby the signal-to-noise ratio D explained with reference to Eq. 1 is increased by a factor of about two. Since D is almost inversely proportional to a second power of the measurement distance, this extension of the integration time can be expected to result in the increase of the effective measurement distance to about 12.6 km, that is, by a factor of about 1.4. A jet airliner cruising at a high altitude has a true airspeed of about 250 m/s, and in the present turbulence detection mode, turbulence can be detected about 50 seconds in advance. The degradation of distance resolution caused by the flight of the aircraft within 4 seconds can be avoided by displacing the range region that is observed to a close distance correspondingly to a true airspeed. With the present device, where turbulence is detected, a word TURBULENCE is automatically displayed on the navigation display, a voice warning is generated, and the mode is switched to the two-dimensional display mode. The pilot verifies that the warning generated in the present turbulence detection mode is sustained for several seconds and is not an erroneous detection and then switches on the seatbelt sign, issues an instruction to stop the onboard services, and focuses attention on the two-dimensional display. In the two-dimensional display mode, a planar distribution of turbulence can be monitored about 36 seconds before the turbulence is reached and therefore the pilot can reduce the effect of turbulence by performing an airspeed reducing operation and avoid the turbulent regions by avoidance steering, if this is operationally possible. In terms of aircraft performance, the flight course can be changed by 90 degrees within about 12 km in a cruise mode even by a usual turning maneuver of a 30-degree bank, and at an angle of 60 degrees, which is the maximum bank angle allowed for an airliner, the flight course can be changed by 90 degrees within about 7 km. During turning, a positive vertical acceleration can be also expected to prevent the items located in the passenger cabin from floating. The mechanism for scanning the laser beam course can be realized, for example, by stacking two wedge-like prisms and rotating the prisms in the opposite directions with respect to each other.

When the pilot determines that the turbulence region cannot be avoided on the basis of the display created in the two-dimensional display mode or by considering the navigational conditions, the pilot selects the gust alleviation mode. In the gust alleviation mode, the integration time of the reception light is set to 0.1 seconds and an airflow vector is calculated in about 0.5 seconds In the case of such a measurement period, fine control such that improves comfort of the passengers is difficult to conduct, but large shaking that can cause accidents can be reduced. Further, because the measurement range becomes equal to or less than 1 km, within a mode in which the distance is measured by a focal distance of an optical telescope, the reception intensity decreases. Therefore, when the gust alleviation mode is selected, a function of automatically reducing the focal distance is added. In the gust alleviation mode, the variation of airspeed and angle of attack can be predicted by measuring the airflow that will be encountered by the aircraft in several seconds. Therefore, the control surface is automatically controlled and shaking of the fuselage is reduced by inputting this information into a FMS (Flight Management System).

Although a Doppler lidar features the possibility of remotely measuring the airflow even when the sky is clear, pilots of operating companies have indicated that the effective range is short and unsuitable for practical use. However, with the present invention, it is not necessary to observe a warning display at all times and the utility is increased.

What is claimed is:

1. A method for preventing turbulence-induced accidents, comprising the steps of:
   using an optical remote airflow measurement device of a Doppler lidar system using a laser beam;
   routinely enabling distant turbulence to be detected by fixing a laser emission course in a flight direction and taking a long integration time of a reception signal as a turbulence-induced accidents mode; and
   enabling a planar distribution of the turbulence to be displayed when turbulence is detected, by scanning the laser emission course in a horizontal direction and switching an image display to a two-dimensional display on an instrument panel as a two-dimensional display mode.

2. The method for preventing turbulence-induced accidents according to claim 1, wherein when a turbulent region is determined to be unavoidable on the basis of an output of the optical remote airflow measurement device of a Doppler lidar system using a laser beam, a two-dimensional vector of airflow can be measured by scanning the laser beam emission course in a vertical direction and airflow information can be outputted for automatically controlling a control surface.

3. An airborne device for preventing turbulence-induced accidents,
   wherein a detection range is expanded and a planar distribution of turbulence can be displayed when the turbulence is detected in a flight direction by providing, in an optical remote airflow measurement device of a Doppler lidar system using a laser beam, a detection device for routinely detecting distant turbulence by fixing a laser emission course in the flight direction and taking a long integration time of a reception signal as a turbulence-induced accidents mode; and a device for scanning the laser emission course in a horizontal direction and switching an image display to a two-dimensional display on an instrument panel as a two-dimensional display mode when turbulence is detected by the detection device.

4. The airborne device for preventing turbulence-induced accidents according to claim 3, further comprising a device for generating a warning when turbulence is detected, and having a function of urging a pilot to monitor the image display switched to the two-dimensional display.

5. The airborne device for preventing turbulence-induced accidents according to claim 3, having a function of being capable of measuring a two-dimensional vector of airflow by scanning the laser beam emission course in a vertical direction and capable of outputting airflow information for autopilot command input when a turbulent region is determined to be unavoidable in the optical remote airflow measurement device of a Doppler lidar system using a laser beam.

6. The airborne device for preventing turbulence-induced accidents according to claim 4, having a function of being capable of measuring a two-dimensional vector of airflow by scanning the laser beam emission course in a vertical direction and capable of outputting airflow information for autopilot command input when a turbulent region is determined to be unavoidable in the optical remote airflow measurement device of a Doppler lidar system using a laser beam.

* * * * *